(12) United States Patent
Sen et al.

(10) Patent No.: US 11,829,496 B2
(45) Date of Patent: *Nov. 28, 2023

(54) WORKFLOW FOR EVALUATING QUALITY OF ARTIFICIAL INTELLIGENCE (AI) SERVICES USING HELD-OUT DATA

(71) Applicant: INTERNATIONAL BUSINESS MACHINES CORPORATION, Armonk, NY (US)

(72) Inventors: Prithviraj Sen, San Jose, CA (US); Rajasekar Krishnamurthy, Campbell, CA (US); Yunyao Li, San Jose, CA (US); Shivakumar Vaithyanathan, San Jose, CA (US); Hao Wang, San Jose, CA (US); Sang Don Han, Sunnyvale, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,537

(22) Filed: Jun. 28, 2022

(65) Prior Publication Data

US 2022/0327331 A1 Oct. 13, 2022

Related U.S. Application Data

(63) Continuation of application No. 16/123,822, filed on Sep. 6, 2018, now Pat. No. 11,429,816.

(51) Int. Cl.
*G06F 21/62* (2013.01)
*G06F 18/21* (2023.01)
(Continued)

(52) U.S. Cl.
CPC .......... *G06F 21/62* (2013.01); *G06F 18/2193* (2023.01); *G06F 18/2321* (2023.01); *G06F 18/241* (2023.01); *G06F 21/60* (2013.01)

(58) Field of Classification Search
None
See application file for complete search history.

(56) References Cited

U.S. PATENT DOCUMENTS

| | | | |
|---|---|---|---|
| 11,429,816 B2* | 8/2022 | Sen ..................... | G06F 18/2321 |
| 2015/0112766 A1* | 4/2015 | Barney .............. | G06Q 30/0203 |
| | | | 705/7.32 |

(Continued)

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

(Continued)

*Primary Examiner* — Tahmina N Ansari
(74) *Attorney, Agent, or Firm* — SHERMAN IP LLP; Kenneth L. Sherman; Steven Laut

(57) ABSTRACT

One embodiment provides for a method for evaluation of an artificial intelligence (AI) service, the method includes partitioning, by a processor, data into in-domain data and out-of-domain data. The processor defines held-out data from both of the in-domain data and the out-of-domain data for evaluation by each of domain and sub-domain based on building a taxonomy of both domains and sub-domains for the AI service. The held-out data is excluded from training data used for training the AI service. The processor further determines distribution underlying performance metrics for the held-out data using bootstrap validation processing. The processor also determines performance guarantees for multiple settings conditioned on multiple characteristics of an (Continued)

application scenario for the held-out data of the taxonomy based on the underlying performance metrics.

20 Claims, 11 Drawing Sheets

(51) Int. Cl.
*G06F 18/241* (2023.01)
*G06F 21/60* (2013.01)
*G06F 18/2321* (2023.01)

(56) References Cited

U.S. PATENT DOCUMENTS

| 2016/0055427 | A1* | 2/2016 | Adjaoute | G06N 20/00 |
| | | | | 706/12 |
| 2016/0350772 | A1* | 12/2016 | Barney | G06Q 30/0203 |
| 2020/0082228 | A1* | 3/2020 | Sen | G06F 18/2321 |
| 2021/0259765 | A1* | 8/2021 | Narayan | G06N 20/00 |

OTHER PUBLICATIONS

List of IBM Patents or Patent Applications Treated as Related; Sen, P., et al., U.S. Appl. No. 16/123,822, filed Sep. 6, 2018.

\* cited by examiner

WORKFLOW FOR EVALUATING QUALITY OF ARTIFICIAL INTELLIGENCE (AI) SERVICES USING HELD-OUT DATA

BACKGROUND

Software services based on Artificial Intelligence (AI) technology often relies on training data. This implies that when the service is deployed on a Customer's data, if there is a mismatch between the Customer's data and the training data then the service may not perform well.

SUMMARY

Embodiments relate to defining data for evaluating artificial intelligence (AI) services. One embodiment provides for a method for evaluation of an AI service, the method includes partitioning, by a processor, data into in-domain data and out-of-domain data. The processor defines held-out data from both of the in-domain data and the out-of-domain data for evaluation by each of domain and sub-domain based on building a taxonomy of both domains and sub-domains for the AI service. The held-out data is excluded from training data used for training the AI service. The processor further determines distribution underlying performance metrics for the held-out data using bootstrap validation processing. The processor also determines performance guarantees for multiple settings conditioned on multiple characteristics of an application scenario for the held-out data of the taxonomy based on the underlying performance metrics.

These and other features, aspects and advantages of the present invention will become understood with reference to the following description, appended claims and accompanying figures.

DETAILED DESCRIPTION

Figure 1:
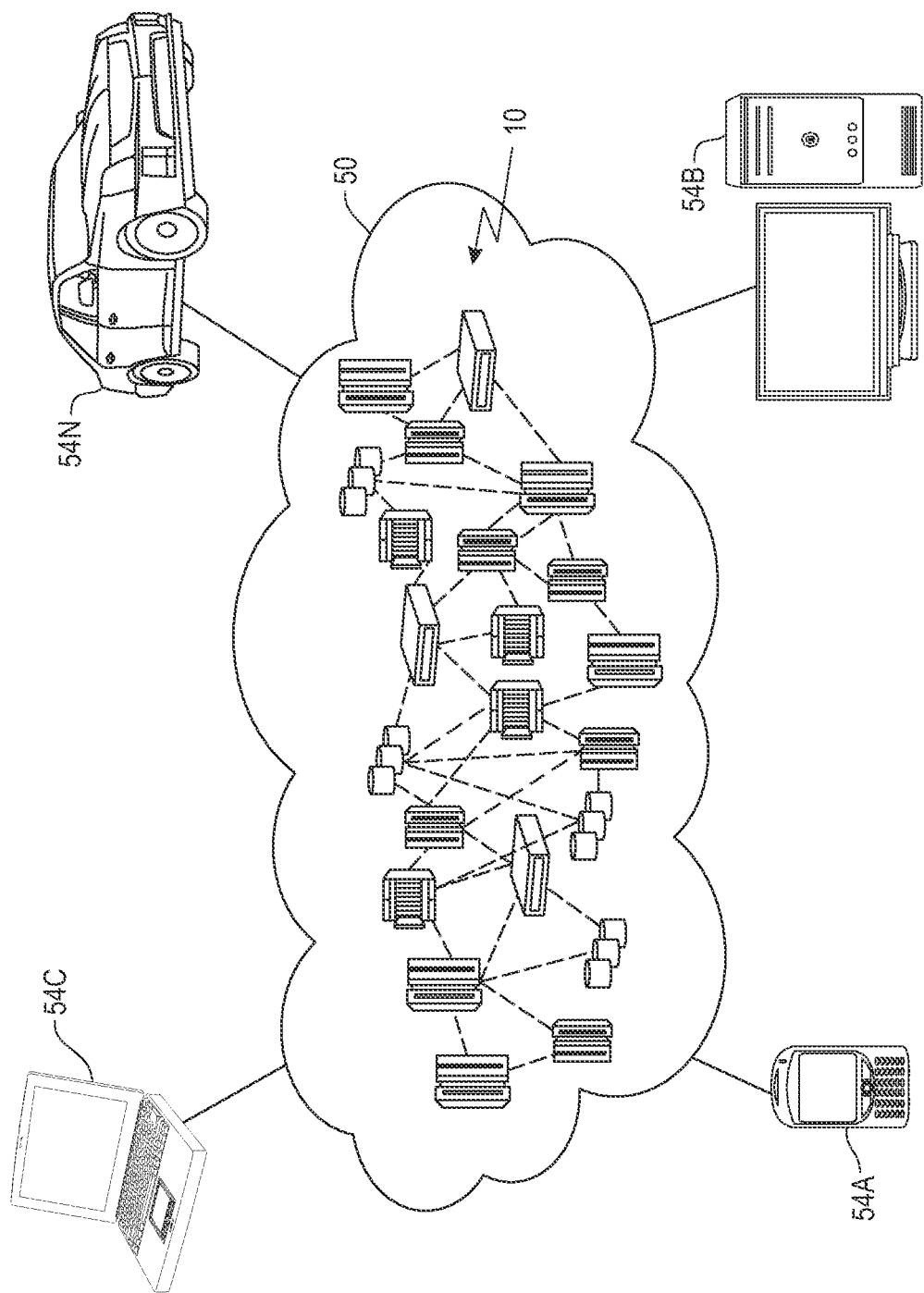
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Embodiments relate to evaluating quality of AI services and determining performance guarantees. One embodiment provides a method for evaluation of an AI service, the method includes partitioning, by a processor, data into in-domain data and out-of-domain data. The processor defines held-out data from the in-domain data and the out-of-domain data for evaluation by domain and sub-domain based on building a taxonomy of domains and sub-domains for the AI service. The processor further determines distribution underlying performance metrics for the held-out data using statistical processing. The processor also determines performance guarantees for multiple settings conditioned on multiple characteristics of an application scenario for the held-out data of the taxonomy based on the underlying performance metrics. The processor further provides confidence intervals based on the performance guarantees.

Many modern software applications rely on AI, for example automated driving, extraction from PDFs, etc. AI algorithms often rely on models built from training data. A mismatch between training data and unseen data, on which the AI service is later deployed, potentially leads to poor results. In one embodiment, an evaluation process is performed that is more objective than conventional systems, quantifies performance in various settings such as performance on different data: within domain, out-of-domain, and differing customer requirements: heavy users and light users; and provides more informative guarantees on performance of each setting. In one embodiment, the performance guarantees may also be used to draw up contracts between the provider of the service and a user.

Conventional evaluation services evaluate AI services on validation data. Compared to the complete data set U, validation data is typically small. The conventional systems have the following drawbacks: the metrics produced may not have any bearing on unseen data; on different sets of unseen data, the same AI service may produce results of differing quality; since developers may be able to "see" validation data, this raises the possibility of "contamination;" and computed metrics may be biased since validation data is not truly held out.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
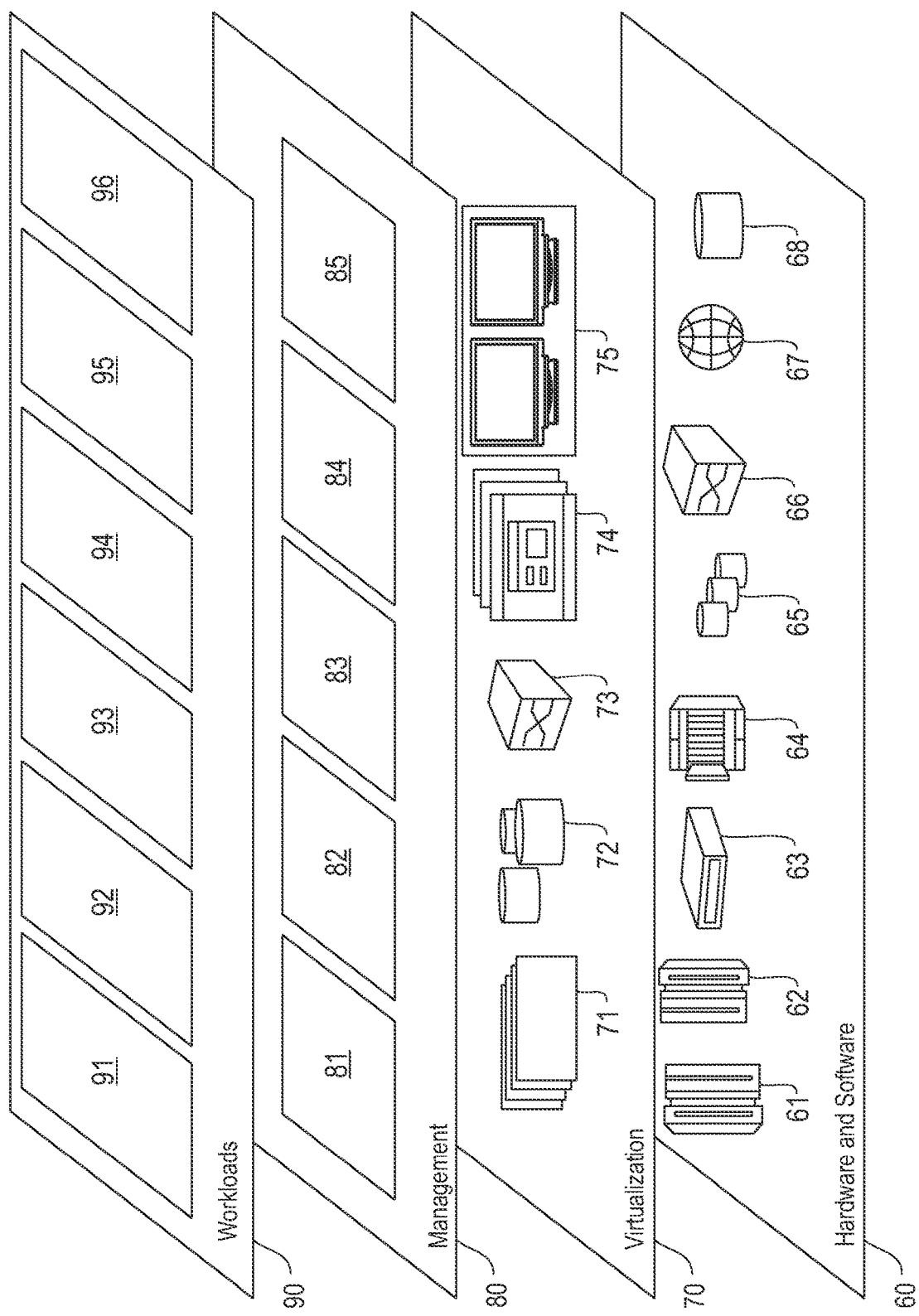
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and evaluating quality of AI services and determining performance guarantees processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3) or the cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
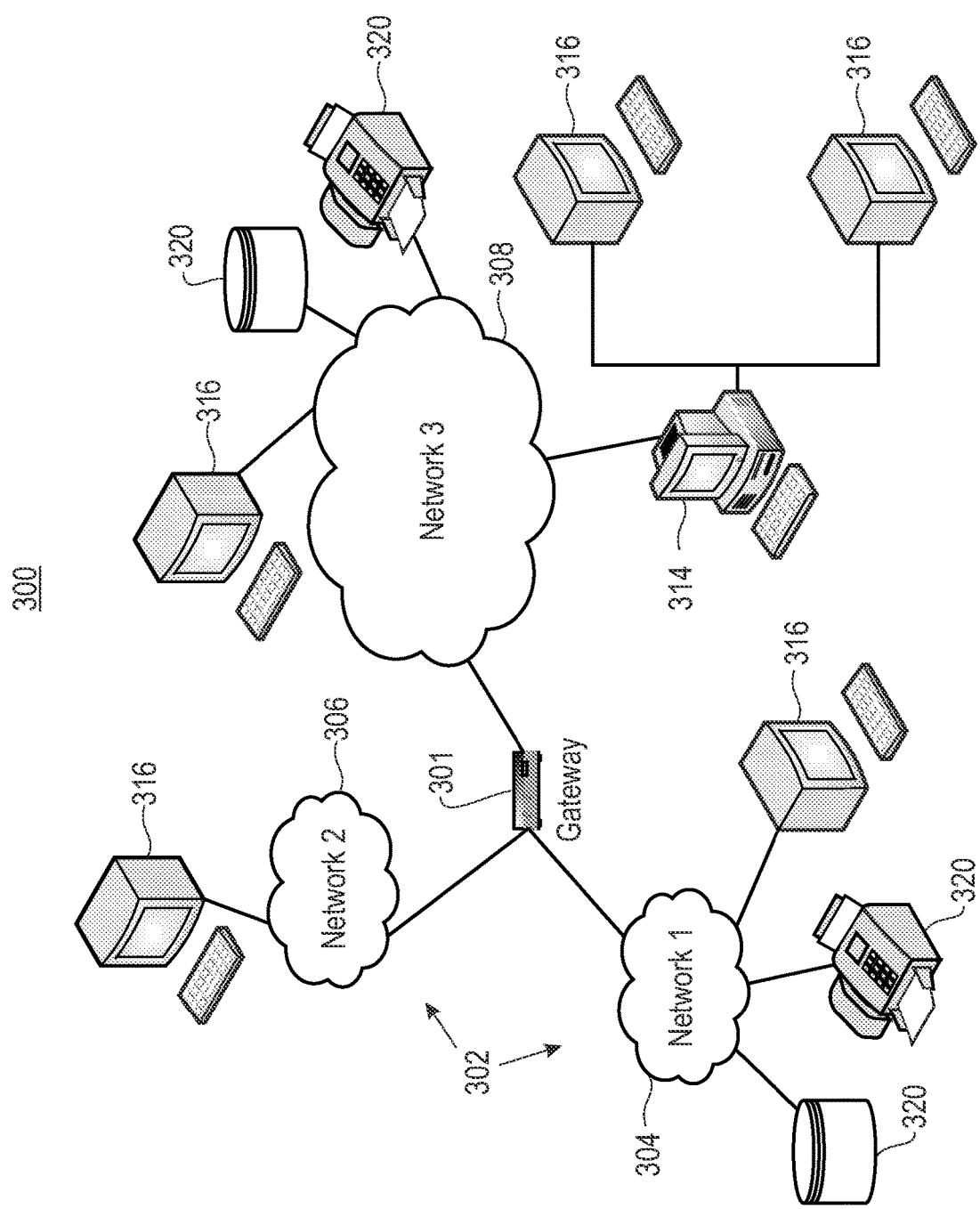
FIG. 3 is a network architecture for evaluating quality of artificial intelligence (AI) services, according to an embodiment.

FIG. 3 illustrates a network architecture 300 for evaluating quality of AI services, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
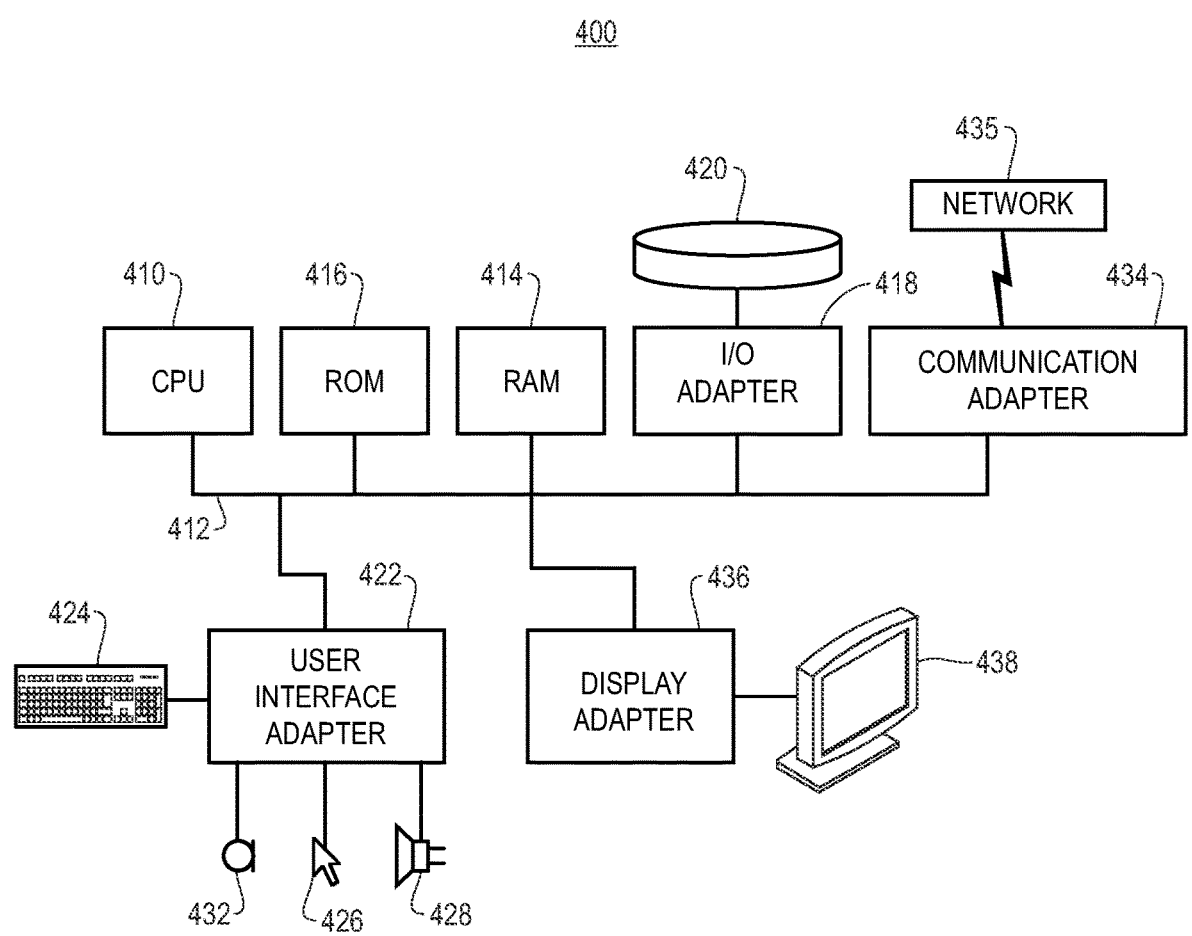
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
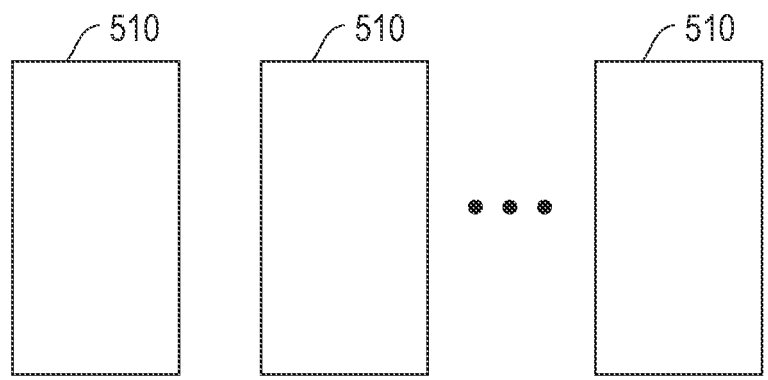
FIG. 5 is a block diagram illustrating a distributed system for evaluating quality of AI services processing, according to one embodiment.
Figure 5:
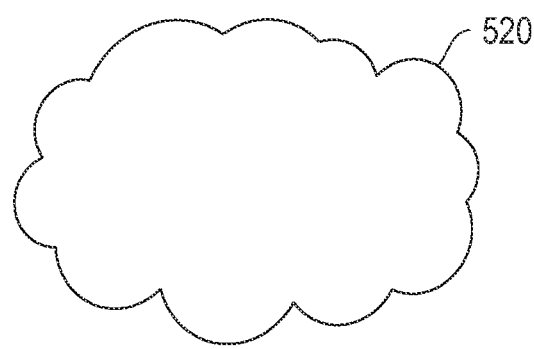
Figure 5:
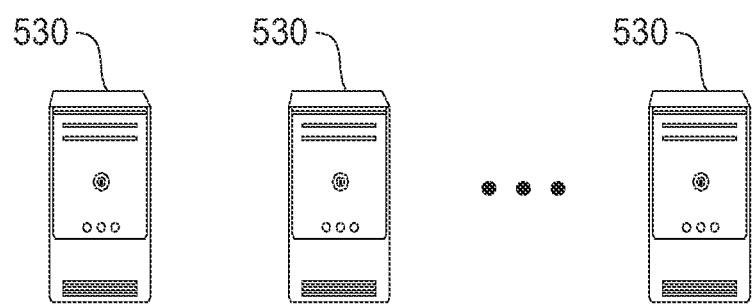

FIG. 5 is a block diagram illustrating a system 500 that may be employed for evaluating quality of AI services processing, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a datacenter, etc.), and servers 530. In one embodiment, the client devices are provided with cloud services from the servers 530 through the cloud or resource sharing environment 520.

In one embodiment, system 500, defines and organizes held-out data for evaluation by domain/sub-domain by building and maintaining a taxonomy. The workflow achieves objective evaluation, provides performance guarantees conditioned on various characteristics of the application scenario such as data characteristics (in-domain versus out-of-domain), etc., also supports providing performance guarantees conditioned on various user-characteristics (such as number of application programming interface (API) calls), and provides informative performance guarantees for each setting.

Figure 6:
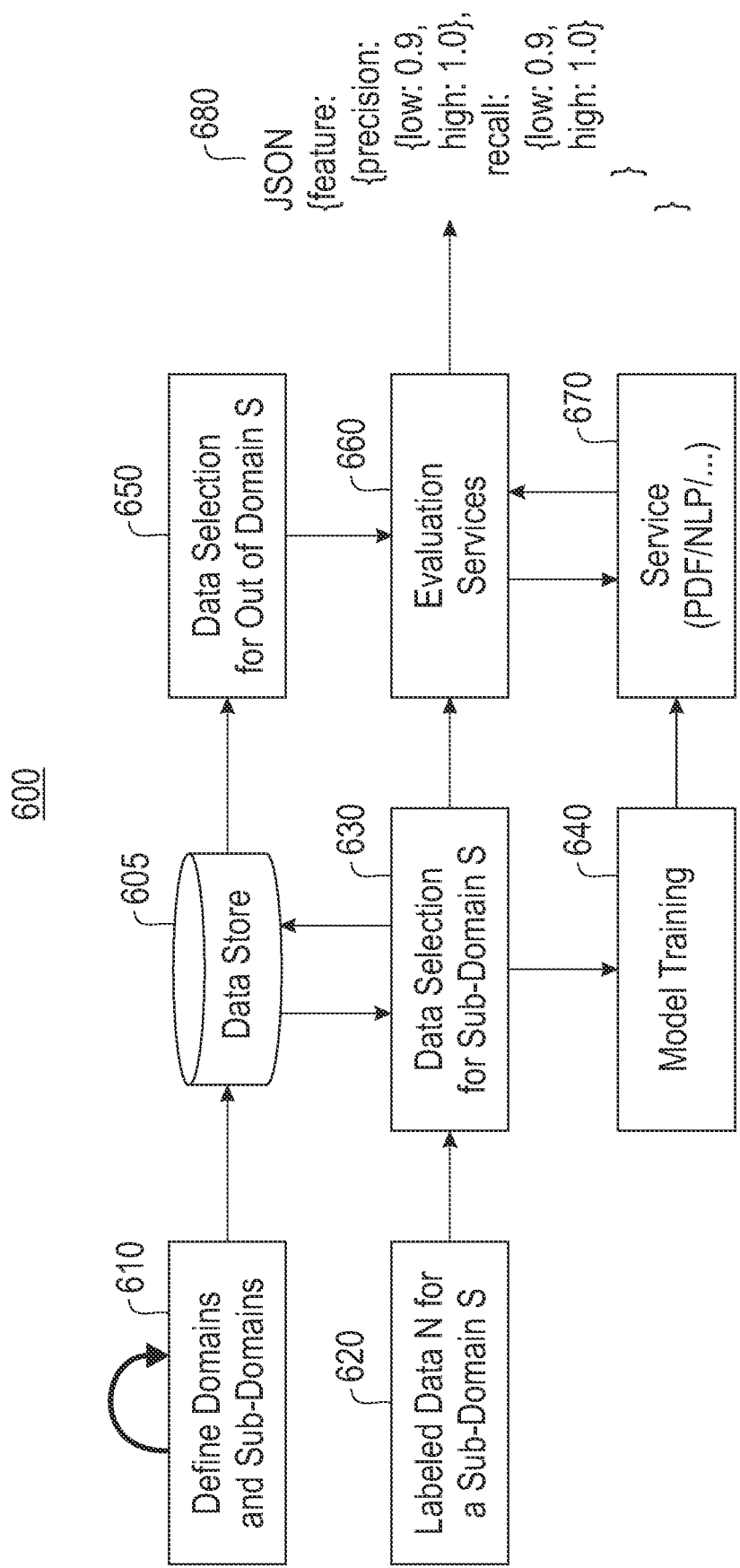
FIG. 6 illustrates an example workflow for evaluation of quality of AI services processing, according to one embodiment.

FIG. 6 illustrates an example workflow 600 for evaluation of quality of AI services processing, according to one embodiment. The workflow 600 achieves objective evaluation by evaluating on truly held-out data protected by enterprise-level security. The held-out data is never accessed by developers developing the service and ensures "uncontaminated" development. In one embodiment, when a new dataset arrives, the workflow divides it into representative portions. The one portion is provided to developers while the remainder is held back for evaluation. The workflow 600 provides performance guarantees conditioned on various characteristics of the application scenario such as data characteristics, (in-domain versus out-of-domain) etc. The performance guarantees are achieved by organizing the data into a taxonomy, and by characterizing other aspects of the application. When evaluating a service, the node(s) in the taxonomy, that the service is devised for, provides in-domain data. Other nodes in the taxonomy provide out-of-domain data. By separately reporting evaluation metrics, one embodiment ensures the assumptions and parameters for which the service is designed is clearly specified. In one embodiment, the workflow 600 supports providing performance guarantees conditioned on various user-characteristics (e.g., number of API calls, etc.). In one embodiment, the workflow 600 provides more informative performance guarantees for each setting. Evaluation metrics reported as simple numbers are often insufficient due to the universe of data of interest being unbounded (in most cases). In one embodiment, the workflow captures the underlying distribution of, for example, precision and recall, and reports, for instance, 95% confidence intervals instead. In one embodiment, the workflow 600 may perform processing using one or more hardware processors (e.g., a hardware processor from cloud computing environment 50, FIG. 1, hardware and software layer 60, FIG. 2, architecture 300, FIG. 3, hardware system 400, FIG. 4, system 500, FIG. 5, etc.).

In one embodiment, block 610 defines domains and sub-domains as an ongoing enhancement. The defined domains and sub-domains are stored in the data store 605 (e.g., memory device(s), disk drive(s), storage system, etc.). Block 620 provides labeled data N for sub-domain S for input to block 630. This is an ongoing process with a manual evaluation and curation. Existing labeled data for S is input to block 630, where data selection for sub-domain S occurs. Block 630 determined hold out labeled data (e.g., datasets model builders cannot access) for evaluation (stored in the data store 605). In one embodiment, standard techniques to perform block 630 include stratified sampling. In settings where classification models are required, stratified sampling allows one to subdivide data so that the class proportions remain intact. For instance, if N contains 30 positive labels and 70 negative labels, then stratified sampling may be used to divide it into a training set and held out set so that both sets contain 30:70 positive:negative labels. In certain cases, even stratified sampling may not be needed. For instance, consider N that contains documents which contain sentences that need to be labeled. If it is assumed that each document contains sentences labeled with positive and negative labels in roughly the same proportion (e.g., each document contains 30% sentences labeled positive, and 70% sentences labeled negative) then simply assigning documents randomly to the training and held out set may suffice.

From block 630, labeled data for model training are communicated to block 640 for model training (e.g., AI, models, deep learning models, machine learning, etc.). While the kind of models trained and the kind of model training algorithms are not critical for block 640, some example embodiments include deep learning models (convolutional neural networks and recurrent neural networks) trained with mini-batch stochastic gradient methods and convex machine learning models that are more amenable to full-batch gradient and second-order optimization techniques which access the hessian of the objective function to speed up convergence.

Using data from the data store 605, block 650 provides data selection for out of domain S. The out of domain data for S is input to block 660 that performs evaluation services. In one embodiment, examples of evaluation services may include cross validation, which divides the (held out) data into K equal parts and estimates the goodness of predictions of each part (e.g., in terms of precision and recall, but not limited to these metrics). Given these results, one embodiment may gain insight into the distribution of the metrics by measuring average and standard deviation. Another evaluation method that may be used in block 660 is a bootstrap that actually provides statistical guarantees beyond the held out data. As opposed to cross validation, bootstrap validation repeatedly creates "new" held out data by randomly sampling from the provided held out data. In one embodiment, block 660 may make copies of data items or does not select a data item for inclusion into the bootstrap. By measuring goodness of predictions from each bootstrap, one embodiment may gain insight into the distribution underlying each evaluation metric. By dropping the lowest and highest 2.5% values of a particular metric, one embodiment may determine the 95% confidence interval.

Raw data from the evaluation services block 660 are communicated to block 670 that includes services (e.g., PDF, natural language processing (NLP), etc.). The service block 670 provides service output data to block 660 for evaluation services. The output from block 660 includes a quality evaluation for in-domain data and out-of-domain data. A representation, such as JSON 680 (or any other format, such as comma-separated values (CSV), etc.) may be determined from the output of block 660.

Figure 7:
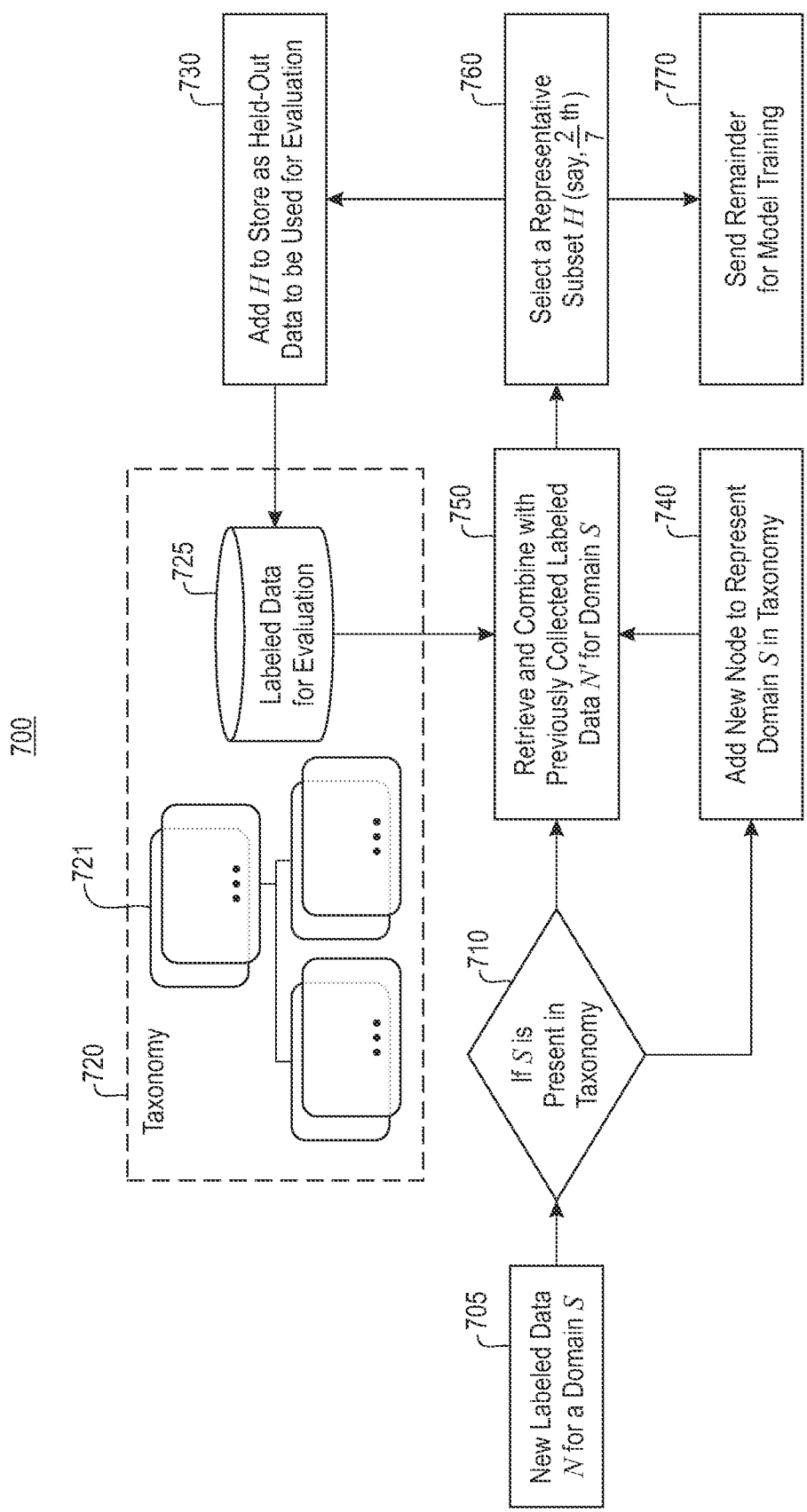
FIG. 7 illustrates a block diagram for a process data sub-division for evaluation of quality of AI services processing, according to one embodiment.

FIG. 7 illustrates a block diagram for a process 700 for data sub-division for evaluation of quality of AI services processing, according to one embodiment. Block 720 includes data for one or more taxonomies 721, and a data store 725 for labeled data used for evaluation. In one embodiment, in block 705 new labeled data N for a domain S is input. In block 710, it is determined whether S is present in a taxonomy. If it is determined that S is not present in a taxonomy, process 700 proceeds to block 740 where process 700 adds a new node to represent S in a taxonomy and proceeds to block 750. If it is determined in block 710 that S is present in a taxonomy, process 700 proceeds to block 750. In block 750, process 700 retrieves and combines the output from block 740 with previously collected labeled data N' for domain S. Process 700 then proceeds to block 760 where a representative subset H (e.g., ⅔ th) is selected. Process 700 then proceeds to blocks 730 and 770. In block 730 process 700 adds subset H to store in the data store 725 as held-out data to be used for evaluation. In block 770, the remaining data (i.e., data not selected in block 760) is sent for model training (for a service). In one embodiment, the process 700 may perform processing using one or more hardware processors (e.g., a hardware processor from cloud computing environment 50, FIG. 1, hardware and software layer 60, FIG. 2, architecture 300, FIG. 3, hardware system 400, FIG. 4, system 500, FIG. 5, etc.).

Figure 8:
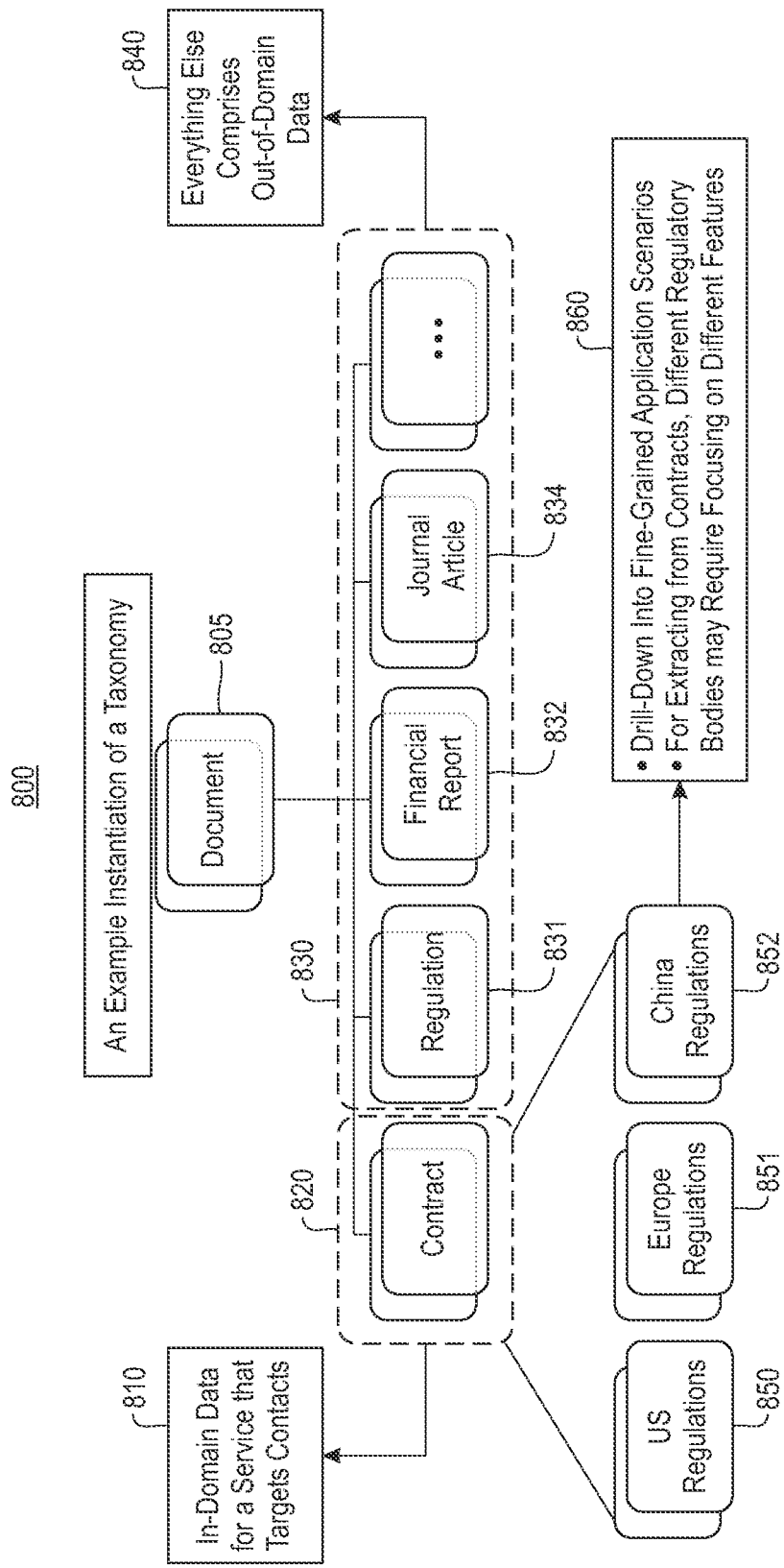
FIG. 8 illustrates a block diagram of an example taxonomy used for performance guarantees conditioned on data characteristics processing, according to one embodiment.

FIG. 8 illustrates a block diagram of an example taxonomy 800 hierarchy used for performance guarantees conditioned on data characteristics processing, according to one embodiment. The example taxonomy 800 includes a document(s) 805 that is tied to in-domain data for contract category 820, and tied to out-of-domain data 830 including regulation category 831, financial report category 832, journal article 834, etc. In one example, the contract category 820 provides in-domain data 810 for a service that targets contracts. The out-of-domain data 830 provides out-of-domain data 840 for everything accept contract category 820. In one example, the contract category 820 is connected to US regulations 850, Europe regulations 851 and China regulations 852. The data from US regulations 850, Europe regulations 851 and China regulations 852 is provided for processing 860 including drill-down into fine grained application scenarios, for extracting from contracts 820, where different regulatory bodies may require focusing on different features. In the example taxonomy 800, the subdomain is defined by the path.

Figure 9:
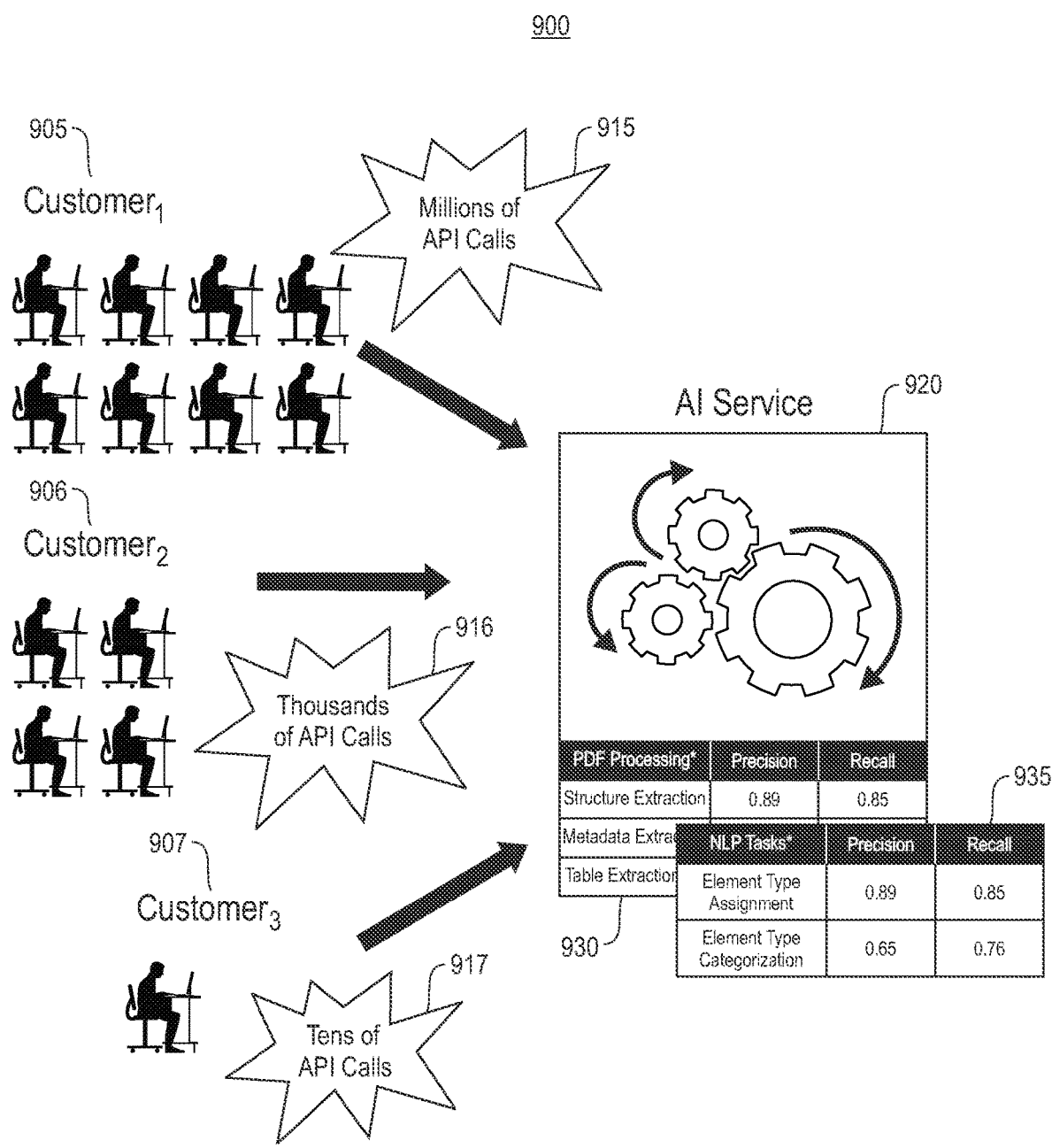
FIG. 9 illustrates an example block diagram for showing performance guarantees conditioned on usage characteristics processing, according to one embodiment.

FIG. 9 illustrates an example 900 block diagram for showing performance guarantees conditioned on usage characteristics processing, according to one embodiment. In one embodiment, the example 900 includes $customer_1$ 905 that may have a need of millions of API calls 915, $customer_2$ 906 that may have a need of thousands of API calls 916, and $customer_3$ 907 that may have a need of tens of API calls 917. For the AI service 920, PDF processing information (e.g., structure extraction, metadata extraction, table extraction, etc.) for precision and recall 930 are generated as well as NLP tasks information (e.g., element type assignment, element categorization, etc.) for precision and recall 935. Given the same AI service 920, it is conceivable that heavy users (e.g., $customer_1$ 905) and light users (e.g., $customer_3$ 907) will encounter different (corpus-level) performance. In one embodiment, to provide performance guarantees to all kinds of users, the processing needs to capture the distribution associated with performance metrics. In the example 900, for large volume customers (e.g., $customer_1$ 905) performance on customer's data adheres to statistical guarantees such as 87% to 93% predictions correct or 45% to 85% predictions correct. For small volume customers (e.g., $customer_3$ 907) guarantees may not hold. Additionally, estimates will be lower and/or more uncertain on out-of-domain data. One example is that this may manifest itself with a wide confidence interval (e.g., precision is between 19% and 99%, etc.).

Figure 10:
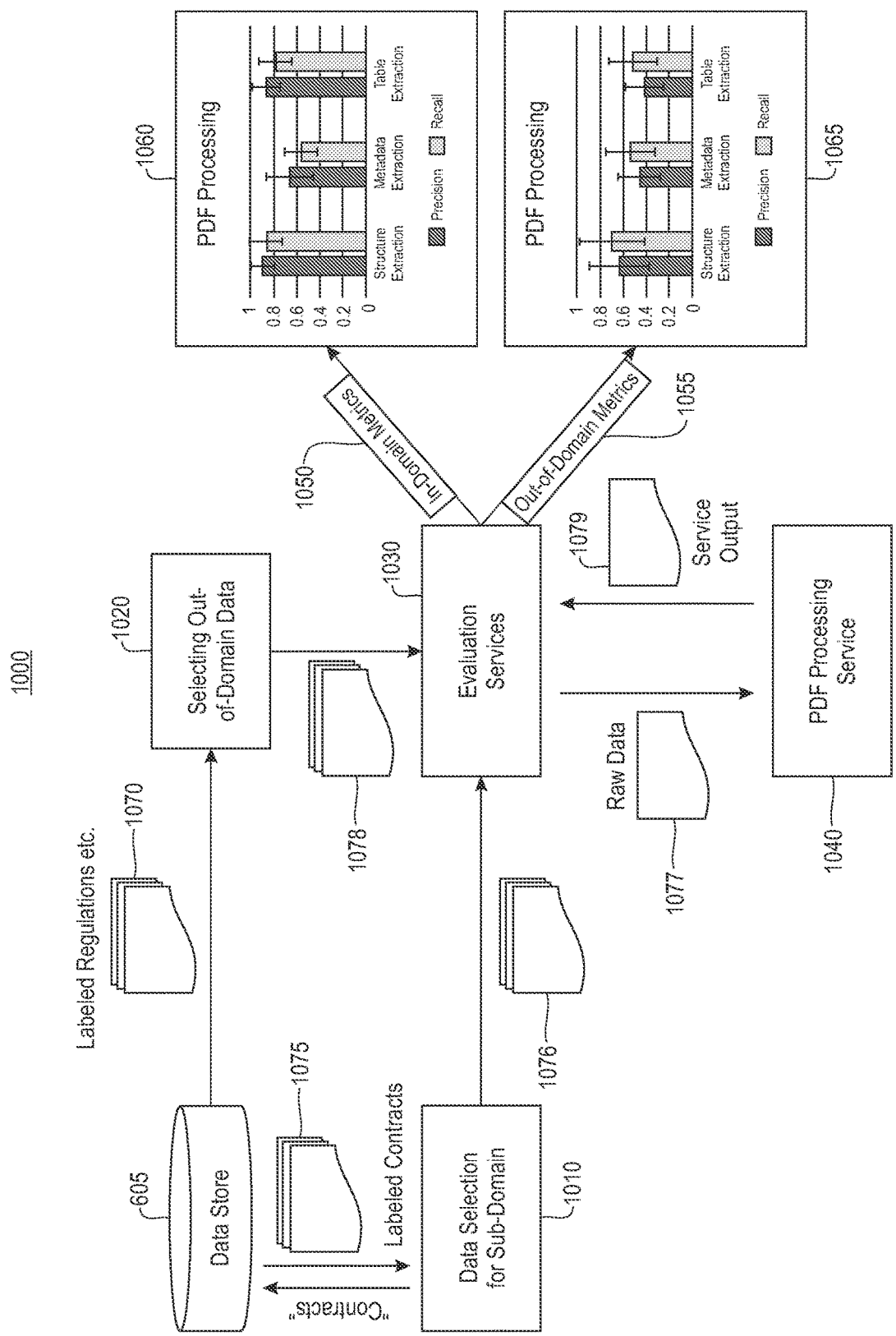
FIG. 10 illustrates an example of performing an evaluation of quality of AI services for determining performance guarantees for portable document format (PDF) processing for contracts, according to one embodiment.

FIG. 10 illustrates an example 1000 of performing an evaluation of quality of AI services for determining performance guarantees for PDF processing for contracts, according to one embodiment. In the end-to-end example 1000, data selection for sub-domain 1010 processing provides data comprising contracts to the data store 605 and receives labeled contracts 1075 from the data store 605. Labeled regulations, etc. 1070 are received by selecting out-of-domain data 1020 processing. Out-of-domain data 1078, selected labeled contracts 1076 and service output 1079 are received by evaluation services 1030. Raw data 1077 is received by the PDF processing service 1040. The output from evaluation services 1030 includes in-domain metrics 1050 and out-of-domain metrics 1055. Information 1060 from in-domain metrics 1050 is generated for precision and recall for PDF processing. Information 1065 from out-of-domain metrics 1055 is generated for precision and recall for PDF processing. In one embodiment, approaches include cross-validation, leave-one-out validation, etc. Bootstrap can quantify the distribution underlying common evaluation metrics. A common form of a statistical guarantee is the 95% confidence interval (e.g., precision E [87%, 93%]). Over time, as processing collects more evaluation data, it is expected that estimates of performance metrics becomes less uncertain (e.g., by narrowing confidence intervals, etc.). In one embodiment, the example 1000 may perform processing using one or more hardware processors (e.g., a hardware processor from cloud computing environment 50, FIG. 1, hardware and software layer 60, FIG. 2, architecture 300, FIG. 3, hardware system 400, FIG. 4, system 500, FIG. 5, etc.).

Figure 11:
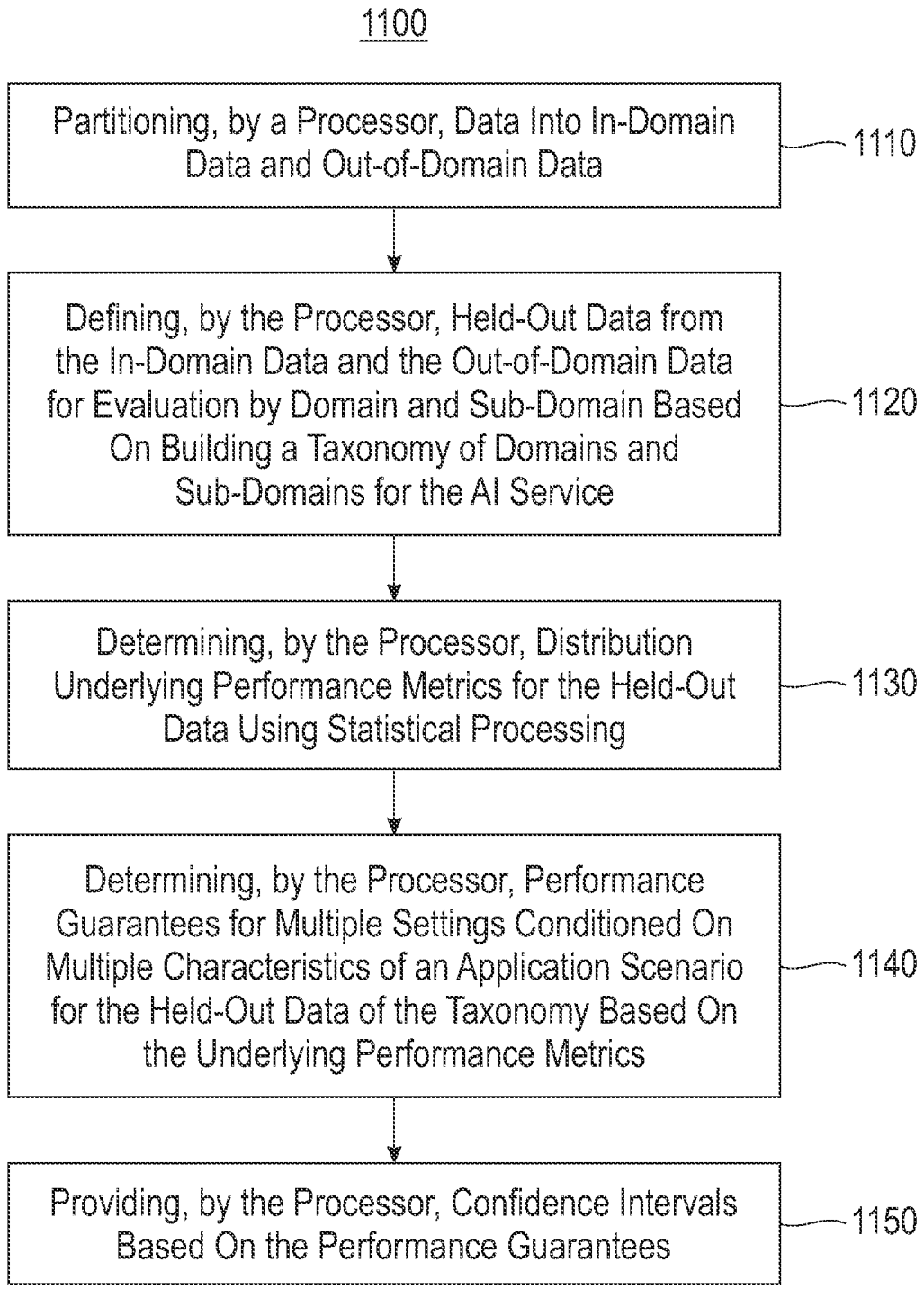
FIG. 11 illustrates a block diagram of a process for performing an evaluation of quality of AI services and determining performance guarantees, according to one embodiment.

FIG. 11 illustrates a block diagram of a process 1100 for performing an evaluation of quality of AI services and determining performance guarantees, according to one embodiment. In one embodiment, in block 1110 process 1100 partitions, using a hardware processor (e.g., a hardware processor from cloud computing environment 50, FIG. 1, Hardware and software layer 60, FIG. 2, architecture 300, FIG. 3, hardware system 400, FIG. 4, system 500, FIG. 5, etc.) data into in-domain data and out-of-domain data. In block 1120, process 1100 defines, by the processor, held-out data from the in-domain data and the out-of-domain data for evaluation by domain and sub-domain based on building a taxonomy of domains and sub-domains for the AI service. In one embodiment, the training set and held out set are created once each time process 1100 gets a new labeled dataset N. Once created, the training set and held out set are stored for future use. This one-time creation helps with repeatability and reproducibility. Block 1130 provides for determining, by the processor, distribution underlying performance metrics for the held-out data using statistical processing. In block 1140, process 1100 determines, by the processor, performance guarantees for multiple settings conditioned on multiple characteristics of an application scenario for the held-out data of the taxonomy based on the underlying performance metrics. In block 1150, process 1100 provides, by the processor, confidence intervals based on the performance guarantees.

In one embodiment, in process 1100 the performance metrics comprises precision information and recall information. In other embodiments, other evaluation metrics may be used (e.g., F-measure, accuracy, etc.). In one embodiment, the held-out data is: protected by enterprise-level security, never accessed by a developer of the AI service, and ensures uncontaminated development of the AI service.

In one embodiment, process 1100 may include partitioning, by the processor, new data into representative portions. One representative portion is provided to developers and a second representative portion is defined as new held-out data. Process 1100 may provide that the multiple characteristics comprise data characteristics and user characteristics.

In one embodiment, process 1100 may include that upon evaluating the AI service, a first portion of nodes in the taxonomy provides the in-domain data, and second portion of nodes in the taxonomy provide the out-of-domain data. In process 1100, a portion of the in-domain data and the out-of-domain data undefined as held-out data is communicated as training data for model training for the AI service.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for evaluation of an artificial intelligence (AI) service, the method comprising:
   partitioning, by a processor, data into in-domain data and out-of-domain data;
   defining, by the processor, held-out data from both of the in-domain data and the out-of-domain data for evaluation by each of domain and sub-domain based on building a taxonomy of both domains and sub-domains for the AI service, wherein the held-out data is excluded from training data used for training the AI service;
   determining, by the processor, distribution underlying performance metrics for the held-out data using bootstrap validation processing; and
   determining, by the processor, performance guarantees for multiple settings conditioned on multiple characteristics of an application scenario for the held-out data of the taxonomy based on the underlying performance metrics.

2. The method of claim 1, further comprising:
   providing, by the processor, confidence intervals based on the performance guarantees;
   wherein the performance metrics comprises precision information and recall information.

3. The method of claim 2, wherein predictions from the bootstrap validation processing are used to determine insight into a distribution underlying each evaluation metric for determining the confidence intervals.

4. The method of claim 1, wherein the held-out data is:
   protected by enterprise-level security;
   never accessed by a developer of the AI service; and
   ensures uncontaminated development of the AI service.

5. The method of claim 1, wherein the bootstrap validation processing comprises:
   creating new held-out data based on random sampling from the held-out data.

6. The method of claim 1, wherein an output from evaluating the AI service includes a quality evaluation for the in-domain data and the out-of-domain data.

7. The method of claim 6, wherein the output from evaluating the AI service is represented in a JavaScript Object Notation (JSON) format or comma-separated values (CSV).

8. A computer program product for evaluation of an artificial intelligence (AI) service, the computer program product comprising a non-transitory computer readable storage medium having program instructions embodied therewith, the program instructions executable by a processor to cause the processor to:
   partition, by the processor, data into in-domain data and out-of-domain data;
   define, by the processor, held-out data from both of the in-domain data and the out-of-domain data for evaluation by each of domain and sub-domain based on building a taxonomy of both domains and sub-domains for the AI service, wherein the held-out data is excluded from training data used for training the AI service;
   determine, by the processor, distribution underlying performance metrics for the held-out data using bootstrap validation processing; and
   determine, by the processor, performance guarantees for multiple settings conditioned on multiple characteristics of an application scenario for the held-out data of the taxonomy based on the underlying performance metrics.

9. The computer program product of claim 8, wherein:
   the program instructions executable by the processor further to cause the processor to:
   provide, by the processor, confidence intervals based on the performance guarantees; and
   the performance metrics comprises precision information and recall information.

10. The computer program product of claim 9, wherein predictions from the bootstrap validation processing are used to determine insight into a distribution underlying each evaluation metric for determining the confidence intervals.

11. The computer program product of claim 8, wherein the held-out data is:
   protected by enterprise-level security;
   never accessed by a developer of the AI service; and
   ensures uncontaminated development of the AI service.

12. The computer program product of claim 8, wherein the bootstrap validation processing comprises creating new held-out data based on random sampling from the held-out data.

13. The computer program product of claim 8, wherein an output from evaluating the AI service includes a quality evaluation for the in-domain data and the out-of-domain data.

14. The computer program product of claim 13, wherein the output from evaluating the AI service is represented in a JavaScript Object Notation (JSON) format or comma-separated values (CSV).

15. An apparatus comprising:
   a memory configured to store instructions; and
   a processor configured to execute the instructions to:
   partition data into in-domain data and out-of-domain data;

define held-out data from both of the in-domain data and the out-of-domain data for evaluation by each of domain and sub-domain based on building a taxonomy of both domains and sub-domains for an artificial intelligence (AI) service, wherein the held-out data is excluded from training data used for training the AI service;

determine distribution underlying performance metrics for the held-out data using bootstrap validation processing; and determine performance guarantees for multiple settings conditioned on multiple characteristics of an application scenario for the held-out data of the taxonomy based on the underlying performance metrics.

16. The apparatus of claim 15, wherein:

the processor is further configured to execute the instructions to:

provide confidence intervals based on the performance guarantees;

the performance metrics comprises precision information and recall information; and the held-out data is:

protected by enterprise-level security;

never accessed by a developer of the AI service; and ensures uncontaminated development of the AI service.

17. The apparatus of claim 16, wherein predictions from the bootstrap validation processing are used to determine insight into a distribution underlying each evaluation metric for determining the confidence intervals.

18. The apparatus of claim 15, wherein the bootstrap validation processing comprises:

creating new held-out data based on random sampling from the held-out data.

19. The apparatus of claim 15, wherein an output from evaluating the AI service includes a quality evaluation for the in-domain data and the out-of-domain data.

20. The apparatus of claim 19, wherein the output from evaluating the AI service is represented in a JavaScript Object Notation (JSON) format or comma-separated values (CSV).

* * * * *